US007259792B2

(12) United States Patent
Terada

(10) Patent No.: US 7,259,792 B2
(45) Date of Patent: Aug. 21, 2007

(54) OPTICAL SYSTEM CONTROLLER FOR VIDEO CAMERA

(75) Inventor: Hirotsugu Terada, Kanagawa (JP)

(73) Assignee: Sony Corporation, Tokyo (JP)

( * ) Notice: Subject to any disclaimer, the term of this patent is extended or adjusted under 35 U.S.C. 154(b) by 761 days.

(21) Appl. No.: 10/649,028

(22) Filed: Aug. 27, 2003

(65) Prior Publication Data

US 2004/0130646 A1 Jul. 8, 2004

(30) Foreign Application Priority Data

Aug. 29, 2002 (JP) ............................. 2002-249937

(51) Int. Cl.
*H04N 5/238* (2006.01)
(52) U.S. Cl. .................... 348/368; 348/222.1; 348/362; 348/345
(58) Field of Classification Search ................ 348/368, 348/222.1, 362, 345
See application file for complete search history.

(56) References Cited

U.S. PATENT DOCUMENTS 6,526,232 B1 * 2/2003 Mizumura .................... 396/72
2002/0154241 A1 * 10/2002 Ohkawara ................... 348/345

FOREIGN PATENT DOCUMENTS

| JP | 5-153462 | 6/1993 |
| JP | 11-346321 | 12/1999 |
| JP | 2000-305004 | 2/2000 |

* cited by examiner

*Primary Examiner*—David Ometz
*Assistant Examiner*—Usman Khan
(74) *Attorney, Agent, or Firm*—Frommer Lawrence & Haug LLP; William S. Frommer; Thomas F. Presson

(57) ABSTRACT

An optical system controller for a video camera having a lens barrel in which is arranged a movable optical system and on the outer surface of which is arranged an adjusting movable mechanism for the movable optical system. It permits the user to recognize easily and directly the display indicating the position of the movable optical system or the opening of the aperture in the lens barrel. The optical system controller consists of the focus adjusting movable mechanism, the zoom adjusting movable mechanism, and the aperture adjusting movable mechanism, which are arranged on the outer surface of the lens barrel; it also consists of the focus lens position display, the zoom lens position display, and the aperture opening display, which constitute the optical display means arranged respectively in the vicinity of the movable mechanisms; the focus lens position display performs optical display in response to the position of the focus lens in the lens barrel, the zoom lens position display performs optical display in response to the position of the zoom lens in the lens barrel, and the aperture opening display performs optical display in response to the opening of the iris diaphragm in the lens barrel.

9 Claims, 9 Drawing Sheets

F I G. 7
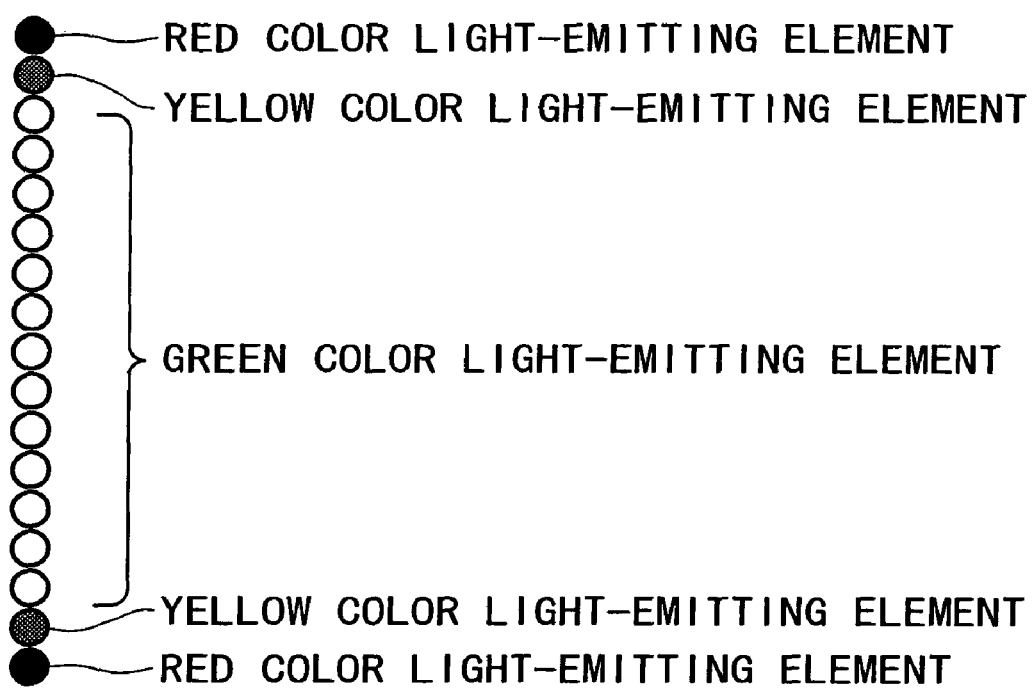
32 (32a)
(33 (33a))
(34 (34a))

(RELATED ART)

OPTICAL SYSTEM CONTROLLER FOR VIDEO CAMERA

BACKGROUND OF THE INVENTION

1. Field of the Invention

The present invention relates to an optical system controller for a video camera which has, as a part thereof, a lens barrel in which is arranged a movable optical system including a zoom lens, an iris diaphragm, and a focusing lens, and on the outer surface of which is arranged a movable mechanism for focusing adjustment, zooming adjustment, and aperture adjustment.

2. Description of the Prior Art

The video camera permits light rays from a subject to pass through an optical system having lenses and enter an imaging unit, so that the image of a subject is projected onto the image plane of the imaging unit. For the image of a subject to be focused sharply at all times, the video camera is required to have autofocusing and zooming capability. (Zooming is the movement of lenses that continuously changes (within a certain range) the magnification of the image of a subject which is projected onto the image plane.) This object is achieved by providing the lens barrel of the video camera with a built-in movable optical system under adequate control.

Such a movable optical system consists of fore-end lens, zooming lens, iris diaphragm, and focusing lens. The iris diaphragm changes its aperture so as to control the amount of light entering the imaging unit, and the zooming lens and focusing lens move along the optical axis.

The movable optical system in the lens barrel causes the zooming lens and focusing lens to move to their adequate positions and also causes the iris diaphragm to have an adequate aperture. These actions are controlled by the mechanisms for focusing adjustment, zooming adjustment, and aperture adjustment, which are mounted on the outside of the lens barrel. Such mechanisms are actuated by movable rings that encircle the periphery of the lens barrel, as shown in FIG. 9.

FIG. 9 is a schematic diagram showing the entire appearance of a conventional video camera. This video camera consists of a camera body 11 and a lens barrel 12 projecting therefrom. The lens barrel 12 has the focus adjusting mechanism 14, the zoom adjusting mechanism 15, and the diaphragm adjusting mechanism 16, each surrounding the outer surface 13 of the lens barrel 12. These mechanisms are arranged in order from the forward end (with a hood) to the camera body 11. Each of these mechanisms is independently rotatable by manual operation with respect to the lens barrel 12.

For autofocusing control, the above-mentioned mechanisms work in such a way that the focusing lens is adequately positioned in the lens barrel according to the position of the zooming lens in the lens barrel. Before the focusing lens finds an adequate position in the lens barrel, it moves back and forth over a comparatively small distance along the optical axis. (This movement is called wobbling.) The range over which the focusing lens wobbles relates to the depth of focus. On the other hand, the depth of focus varies depending on the aperture of the iris diaphragm. Therefore, the autofocusing control involves not only the position of the focusing lens but also the position of the zooming lens and the aperture of the iris diaphragm. Controlling the focusing lens in relation to the zooming lens and iris diaphragm needs information about the position of the focusing lens, the position of the zooming lens, and the opening of the iris diaphragm.

Moreover, zooming requires the focusing lens to follow the zooming lens as it changes the magnification of the image of a subject being projected onto the image plane.

The focusing lens, zooming lens, and iris diaphragm are moved relative to one another by individual motors under programmed control. The amount their movement is usually determined by an electronic control system. In this case, the motors and their circuits and parts may be arranged inside or outside the lens barrel. The motors receive control signals from the movable mechanisms for adjustment of zooming, focusing, and aperture in response to their movement.

The disadvantage of the electronic control system is that the position of the focusing lens and zooming lens and the opening of the iris diaphragm do not correspond directly to the amount of rotation of the movable mechanisms for adjustment of the focusing lens, zooming lens, and iris diaphragm. In other words, the positions of the movable mechanisms do not always indicate the controlled positions of the focusing and zooming lens and the opening of the iris diaphragm.

To cope with this situation, the video camera with the movable optical system and electronic control system is so designed as to display in the view finder or monitor information signals indicating the current positions of the focusing and zooming lens and the current opening of the iris diaphragm. FIG. 10 is a diagram illustrating the view finder or monitor of the conventional video camera which displays information about the positions of the focusing and zooming lens and the opening of the iris diaphragm. In FIG. 10, the image of the view finder or monitor has a meter (17) to indicate the position of the zooming lens, a meter (18) to indicate the position of the focusing lens, and a sign (19) to indicate the opening of the iris diaphragm.

The above-mentioned video camera provided with a view finder or monitor which displays information about the positions of the zooming and focusing lenses and the opening of the iris diaphragm permits the user to know the positions of the zooming and focusing lenses and the opening of the iris diaphragm by watching the view finder or monitor. In other words, the user of the video camera can constantly know the positions of the zooming and focusing lenses and the opening of the iris diaphragm during his camera operation.

In practice, however, the user of the video camera often leaves his eye from the view finder or monitor during his camera operation, because the user tires of continuously watching the view finder or monitor for a long time and the user sometimes needs to see his surrounding scene. This is easily understood from the user's own experience or from the observation of the user's action.

However, once the user of the video camera turns his eye away from the view finder or monitor, he cannot know any longer the positions of the focusing and zooming lenses and the opening of the iris diaphragm in the lens barrel. In other words, the user of the video camera cannot know instantly the positions of the focusing and zooming lenses and the opening of the iris diaphragm while he is waiting for the chance of taking pictures, with his eye turned away from the view finder or monitor. As the result, it is difficult for him to set up immediately the adequate positions of the focusing and zooming lenses and the adequate opening of the iris diaphragm in the case of decisive moment for photographing while he is waiting for a chance. Thus, he would miss the chance to take sharp images at the decisive moment. This situation is serious if the user of the video camera is a professional camera man.

Also, it is not unusual for a professional camera man to take pictures without watching the view finder or monitor; however, in such a case, too, he cannot know the positions of the focusing and zooming lenses and the opening of the iris diaphragm.

The present invention was completed in view of the foregoing. It is an object of the present invention to provide an optical system controller for a video camera having therein an electronically-controlled movable optical system including a zooming lens, focusing lens, and iris diaphragm and also having a lens barrel around which are arranged movable mechanisms for focusing control, zooming control, and aperture control, said optical system controller permitting the user of the video camera to recognize accurately and rapidly the positions of the zooming lens and focusing lens and the opening of the iris diaphragm in the lens barrel while he is not watching the view finder or monitor of the video camera.

SUMMARY OF THE INVENTION

The present invention is directed to an optical system controller for a video camera which comprises a lens barrel having therein a movable optical system including a zooming lens, a focusing lens, and an iris diaphragm; movable mechanisms for focusing control, zooming control, and aperture control which are arranged around the lens barrel; a control means that controls the driving of said movable mechanisms for focusing control, zooming control, and aperture control; a first, second, and third optical display means which are arranged near said movable mechanisms for focusing control, zooming control, and aperture control which are arranged around the lens barrel; a first, second, and third detecting means to detect respectively the position of said focusing lens, the position of said zooming lens, and the opening of said iris diaphragm which change in the lens barrel; a first display control means which causes said first optical display means to make a display in response to the position of the focusing lens which has been detected by said first detecting means; a second display control means which causes said second optical display means to make a display in response to the position of the zooming lens which has been detected by said second detecting means; and a third display control means which causes said third optical display means to make a display in response to the opening of the iris diaphragm which has been detected by said third detecting means.

According to the second aspect of the present invention, the optical system controller for a video camera is characterized in that the first optical display means is arranged near the focus adjusting movable mechanism, the second optical display means is arranged near the zoom adjusting movable mechanism, and the third optical display means is arranged near the diaphragm adjusting movable mechanism.

According to the fifth aspect of the present invention, the optical system controller for a video camera is characterized in that each of the first, second, and third optical display means is constructed of light-emitting elements in array so that it emits colored light.

According to the present invention, the optical system controller for a video camera functions in the following manner. The display in response to the position of the focusing lens in the lens barrel is produced by the first optical display means arranged near the focus adjusting movable mechanism placed around the lens barrel. The display in response to the position of the zooming lens in the lens barrel is produced by the second optical display means arranged near the zoom adjusting movable mechanism placed around the lens barrel. The display in response to the opening of the iris diaphragm in the lens barrel is produced by the third optical display means arranged near the zoom adjusting movable mechanism placed around the lens barrel. The first optical display means is close to the focus adjusting movable mechanism placed around the lens barrel. The second optical display means is close to the zoom adjusting movable mechanism placed around the lens barrel. The third optical display means is close to the diaphragm adjusting movable mechanism placed around the lens barrel. Such arrangement as mentioned above permits the user of the video camera to watch directly and certainly the display of each of the optical display means.

Thus, even in the case where a video camera has an electronic control system for the movable optical system including a zooming lens, focusing lens, and iris diaphragm in the lens barrel, the user of the video camera can recognize accurately and rapidly the positions of the focusing and zooming lenses and the opening of the iris diaphragm in the lens barrel by means of the displays produced by the first, second, and third optical display means, while he is not watching the view finder or monitor of the video camera provided with the optical system controller.

Each of the first, second, and third optical display means produces its color display by means of light-emitting elements in array. Therefore, the first, second, and third optical display means arranged around the lens barrel produce an easily visible display without requiring any special illuminating means. Consequently, the user of the video camera provided with the optical system controller can recognize adequately and very easily the positions of the focusing and zooming lenses and the opening of the iris diaphragm in the lens barrel.

BRIEF DESCRIPTION OF THE DRAWINGS

FIG. 7 is a conceptual diagram illustrating the focus lens position display, the zoom lens position display, and the aperture display in the embodiment shown in FIG. 1.

DESCRIPTION OF THE PREFERRED EMBODIMENTS

Figure 1:
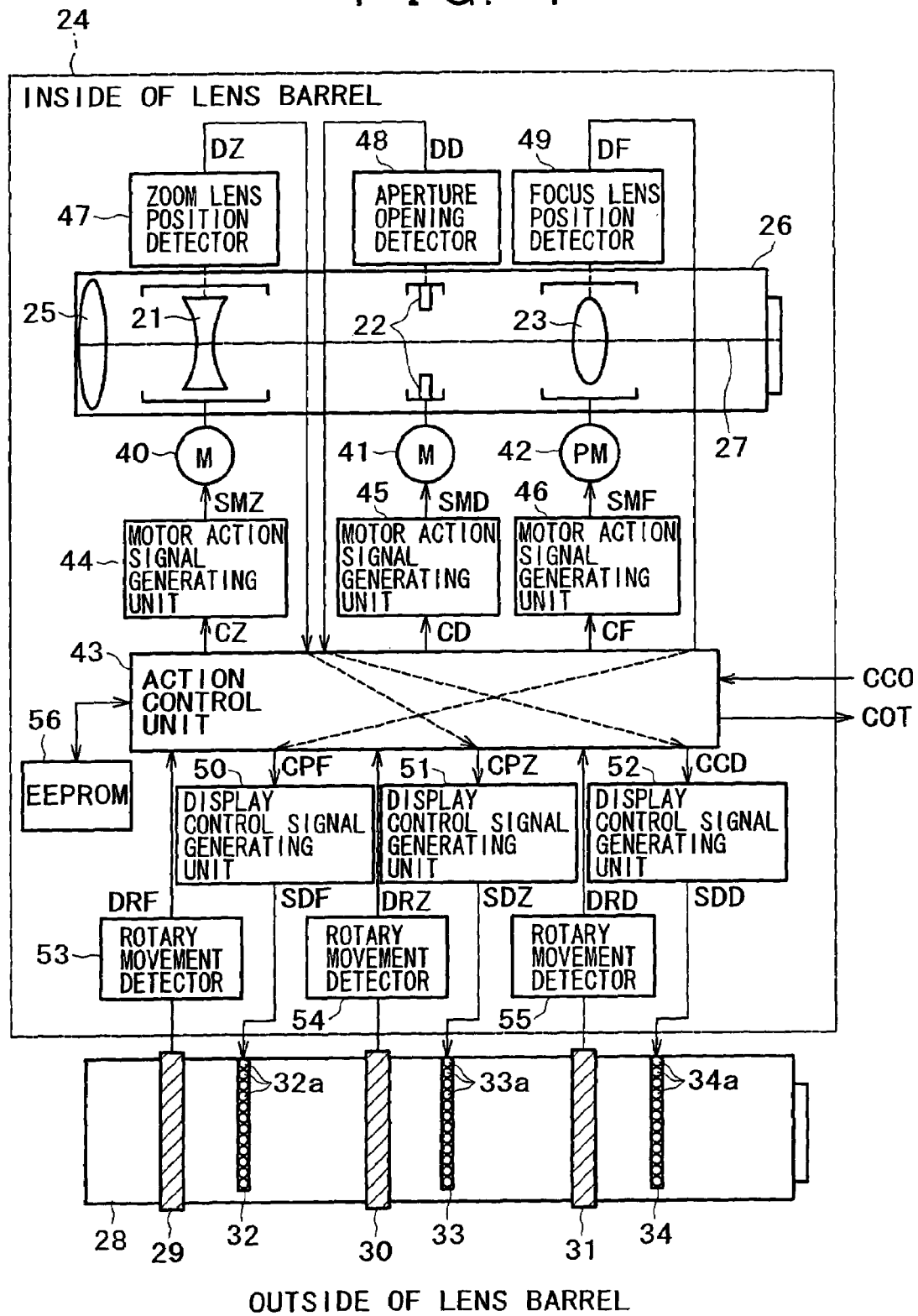
FIG. 1 is a block diagram showing the construction of one embodiment of the optical system controller of a video camera according to the present invention.

FIG. 1 is a block diagram showing the construction of one embodiment of the optical system controller of a video camera according to the present invention.

In FIG. 1 illustrating one embodiment of the present invention, there is shown a lens barrel 24 which has a built-in movable optical system including a fore-end lens 25, a zooming lens 21, an iris diaphragm 22, and a focusing lens 23. These optical components are held by a cylindrical part 26.

In the cylindrical part 26 are sequentially arranged the fore-end lens 25, zooming lens 21, iris diaphragm 22, and focusing lens 23, from front to rear, along the common optical axis 27. While the fore-end lens 25 is fixed, the zooming lens 21 and focusing lens 23 are movable back and forth, over a predetermined distance, in the cylindrical part 26 in the direction along the common optical axis 27.

On the outer surface 28 of the lens barrel 24 are arranged a focus adjusting movable mechanism 29, a zoom adjusting movable mechanism 30, and an aperture adjusting movable mechanism 31. There are also arranged a focus lens position display 32, a zoom lens position display 33, and an aperture opening display 34. Each of the focus adjusting movable mechanism 29, the zoom adjusting movable mechanism 30, and the aperture adjusting movable mechanism 31 constitutes a ring that encircles the outer surface 28 of the lens barrel. The ring is movable in the circumferential direction relative to the outer surface 28 of the lens barrel. The focus lens position display 32, the zoom lens position display 33, and the aperture opening display 34 are arranged respectively near the focus adjusting movable mechanism 29, the zoom adjusting movable mechanism 30, and the aperture adjusting movable mechanism 31.

The focus lens position display 32, which consists of juxtaposed light-emitting elements 32a, is placed next to the focus adjusting movable mechanism 29. Thus, the focus lens position display 32 constitutes the first optical display means which optically displays the position of the focus lens 23 in the lens barrel 24.

Also, the zoom lens position display 33, which consists of juxtaposed light-emitting elements 33a, is placed next to the zoom adjusting movable mechanism 30. Thus, the zoom lens position display 33 constitutes the second optical display means which optically displays the position of the zoom lens 24 in the lens barrel 24.

Also, the aperture opening display 34, which consists of juxtaposed light-emitting elements 34a, is placed next to the aperture adjusting movable mechanism 31. Thus, the aperture opening display 34 constitutes the third optical display means which optically displays the opening of the iris diaphragm 22 in the lens barrel 24.

Figure 2:
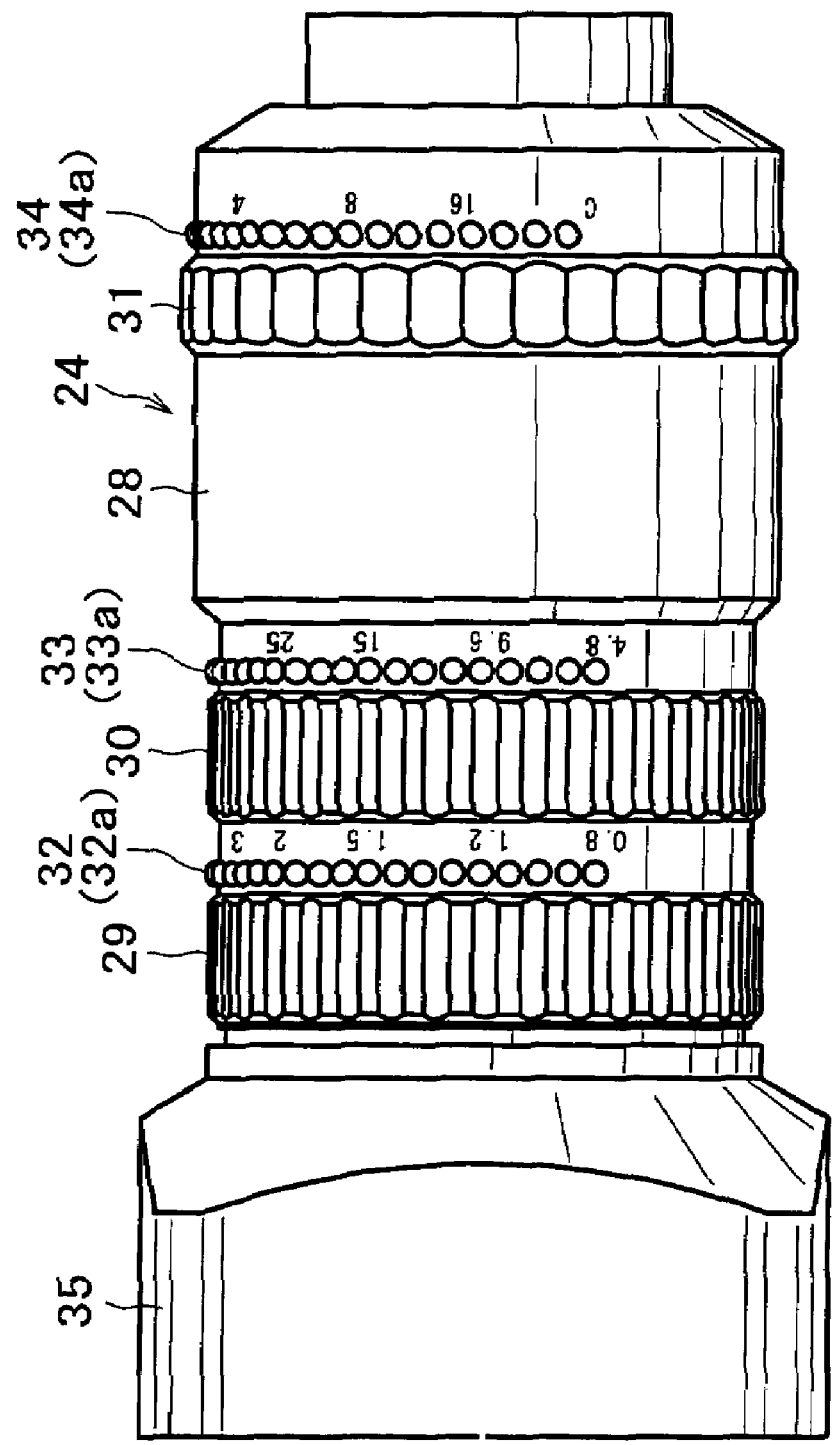
FIG. 2 is a side view of one example of the lens barrel shown in FIG. 1.

FIG. 2 is a side view of one example of the lens barrel 24 which has therein a movable optical system including the zoom lens 21, the iris diaphragm 22, and the focus lens 23 and which also has on its outside 28 the focus adjusting movable mechanism 29, the zoom adjusting movable mechanism 30, the aperture adjusting movable mechanism 31, the focus lens position display 32, the zoom lens position display 33, and the aperture opening display 34, as mentioned above. In the embodiment shown in FIG. 2, the focus lens position display 32, which consists of juxtaposed light-emitting elements 32a, has a series of numerals which indicates the focusing distance. Similarly, the zoom lens position display 33, which consists of juxtaposed light-emitting elements 33a, has a series of numerals which indicates the focal length. Further, the aperture opening display 34, which consists of juxtaposed light-emitting elements 34a, has a series of numerals which indicates the opening of the aperture.

In the embodiment shown in FIG. 2, each of the focus adjusting movable mechanism 29, the zoom adjusting movable mechanisms 30, and the aperture adjusting mechanism 31 has its peripheral surface entirely knurled for easy manual operation. In addition, a hood 35 is mounted on the fore-end of the lens barrel.

Figure 3:
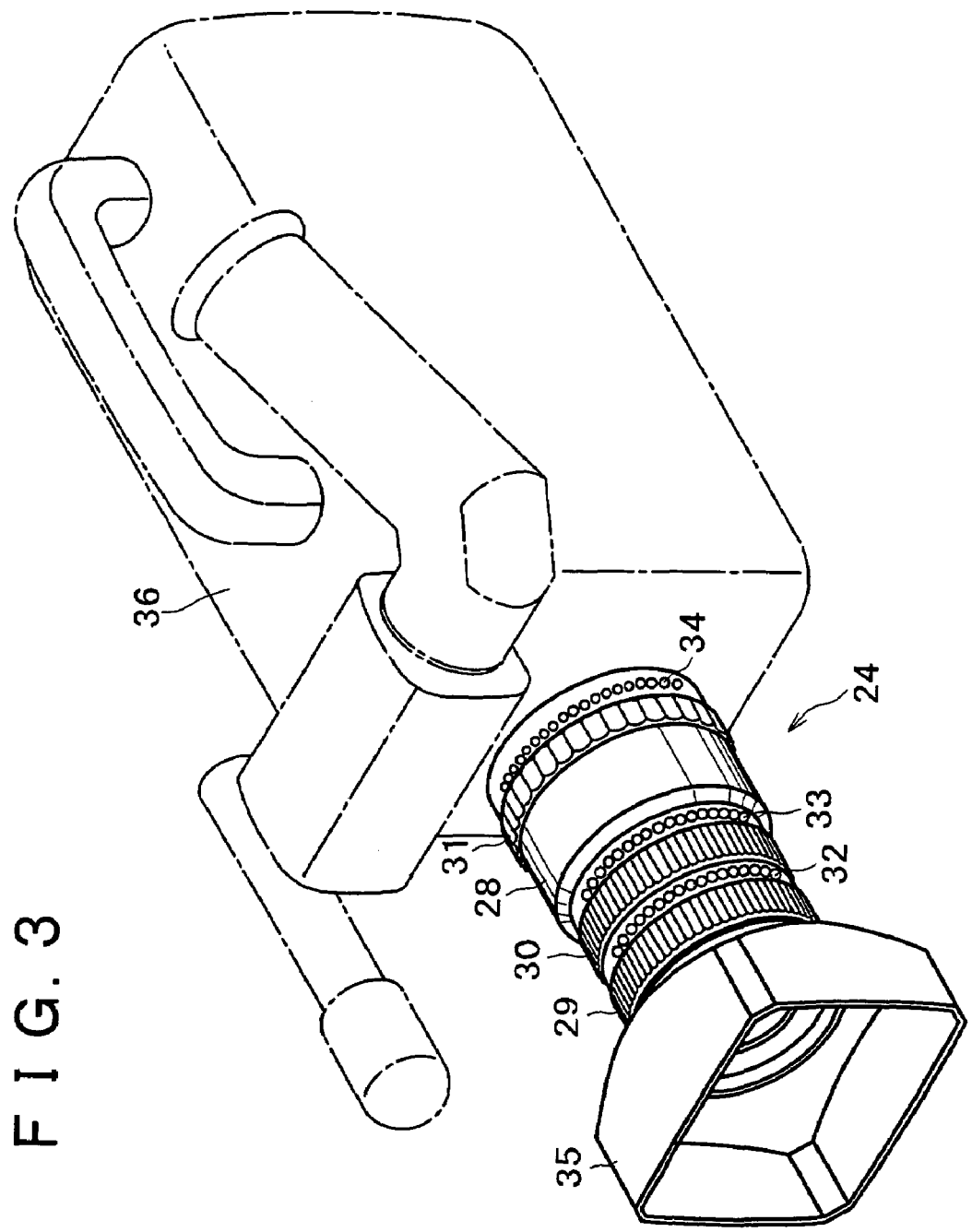
FIG. 3 is a schematic perspective view showing a video camera which has the lens barrel shown in FIG. 2.

FIG. 3 is a schematic perspective view showing one embodiment of the video camera which has the lens barrel shown in FIG. 2. In this embodiment, the lens barrel 24 is attached to the fore-end of the camera body 36 so that it constitutes the integral part of the video camera.

In the embodiment shown in FIG. 1, the lens barrel 24 is provided therein with the electronic control system to control the zoom lens 21, the iris diaphragm, and the focus lens 23, which are arranged in the optical system supporting cylinder 26. The electronic control system includes a motor 40 to drive the zoom lens 21, a motor 41 to drive the iris diaphragm 22, and a pulse motor 42 to drive the focus lens 3.

The motor 40 works as the action control unit 43 (which is a microcomputer included in the electronic control system) issues the zoom controlling signal CZ to the motor action signal generating unit 44, which subsequently issues, according to the zoom controlling signal CZ, to the motor action signal SMZ. Both the motor 40 and the motor action signal generating unit 44 constitute the first optical system drive means which moves the zoom lens 21 in the direction along the common optical axis 27 in response to the zoom controlling signal CZ.

Also, the motor 41 works as the action control unit 43 issues the aperture control signal CD to the motor action signal generating unit 45, which subsequently issues, according to the aperture control signal CD, to the motor action signal SMD. Both the motor 41 and the motor action signal generating unit 45 constitute the second optical drive means which drive the iris diaphragm in response to the aperture control signal CD.

In addition, the pulse motor 42 works as the action control unit 43 issues the focus controlling signal CF to the motor action signal generating unit 46, which subsequently issues, according to the focus controlling signal CF, to the motor action signal SMF. Both the pulse motor 42 and the motor action signal generating unit 46 constitute the third optical system drive means which moves the focus lens 23 in the direction along the common optical axis 27 in response to the focus controlling signal CF.

The zoom lens 21, which is driven by the motor 40, is provided with the zoom lens position detector 47 to detect its position in the lens barrel 24. The iris diaphragm, which is driven by the motor 41, is provided with the aperture opening detector 48 to detect the opening of the diaphragm in the lens barrel 24. The focus lens 23, which is driven by the pulse motor 42, is provided with the focus lens position detector 49 to detect its position in the lens barrel 24. All of the zoom lens position detector 47, the aperture opening detector 48, and the focus lens position detector 49 are included in the electronic control system.

The zoom lens position detector 47 includes a rotary encoder; it generates the detection output signal DZ, which represents the detected position of the zoom lens 21, and sends it to the action control unit 43. The aperture opening detector 48 includes an encoder that employs a Hall element; it generates the detection output signal DD, which represents the detected opening of the iris diaphragm, and sends it to the action control unit 43. The focus lens position detector 49 includes a rotary encoder; it generates the detection output signal DF, which represents the detected position of the focus lens 23, and sends it to the action control unit 43.

The electronic control system includes the display control signal generators 50, 51, and 52. The first one receives the focus lens position signal CPF from the action control unit 43 and generates the display control signal SDF according to the focus lens position signal CPF and sends it to the focus lens position display 32 arranged on the outer surface 28 of the lens barrel. The second one receives the zoom lens position signal CPZ from the action control unit 43 and generates the display control signal SDZ according to the zoom lens position signal CPZ and sends it to the zoom lens position display 33 arranged on the outer surface 28 of the lens barrel. The third one receives the aperture opening signal CCD from the action control unit 43 and generates the display control signal SDD according to the aperture opening signal CCD and sends it to the aperture opening display 34 arranged on the outer surface 28 of the lens barrel. The focus lens position display 32 functions to emit light for display in response to the display control signal SDF from the display control signal generator 50. The zoom lens position display 33 functions to emit light for display in response to the display control signal SDZ from the display control signal generator 51. The aperture opening display 34 functions to emit light for display in response to the display control signal SDD from the display control signal generator 52.

Thus, the display control signal generator 50 constitutes the first display control means which causes the focus lens position display 32 to function in response to the detected position of the focus lens 23. The display control signal generator 51 constitutes the second display control means which causes the zoom lens position display 32 to function in response to the detected position of the zoom lens 33. The display control signal generator 52 constitutes the third display control means which causes the aperture opening display 34 to function in response to the detected opening of the iris diaphragm 22.

In addition, the electronic control system includes the rotary motion detector 53 to detect the rotary motion of the focus adjusting movable mechanism 29 which is arranged on the outer surface 28 of the lens barrel, the rotary motion detector 54 to detect the rotary motion of the zoom adjusting movable mechanism 30 which is arranged on the outer surface 28 of the lens barrel, and the rotary motion detector 55 to detect the rotary motion of the aperture adjusting movable mechanism 31 which is arranged on the outer surface 28 of the lens barrel. The rotary motion detector 53 includes a rotary encoder; it generates the detected output signal DRF to represent the detected rotary motion of the focus adjusting movable mechanism 29 and sends it to the action control unit 43. The rotary motion detector 54 includes a rotary encoder; it generates the detected output signal DRZ to represent the detected rotary motion of the zoom adjusting movable mechanism 30 and sends it to the action control unit 43. The rotary motion detector 55 includes a rotary encoder; it generates the detected output signal DRD to represent the detected rotary motion of the aperture adjusting movable mechanism 31 and sends it to the action control unit 43.

The action control unit 43 exchanges data with the EEPROM 56 (electrically erasable/programmable read only memory) which constitutes a part thereof; it performs control according to the program taken from the EEPROM 56. In addition, the action control unit 43 is supplied with the external control signal CCO which includes the focus adjusting control signal, zoom adjusting control signal, and the aperture adjusting control signal. Thus, the action control unit 43 performs the controlling action as mentioned in the following.

When the action control unit 43 is supplied with the external control signal CCO (which may be the focus adjusting control signal) or with the detection output signal DRF from the rotary motion detector 53, then it performs a prescribed process on the focus adjusting control signal from the outside or the detection output signal DRF from the rotary motion detector 53, and then it generates the focus control signal CF based thereon and sends the focus control signal CF to the motor action signal generator 46. Thus, the pulse motor 42 functions in response to the motor action signal SMF based on the focus control signal CF from the motor action signal generator 46 and moves the focus lens 23 (arranged in the optical system supporting cylinder 26) in the direction along the common optical axis 27 according to the focus control signal CF. At this time, the action control unit 43 performs a prescribed process on the focus control signal CF, generates the focus control signal for transmission, and transmits it as the external transmission signal COT.

Similarly, when the action control unit 43 is supplied with the zoom adjusting control signal from outside as the external control signal CCO or with the detection output signal DRZ from the rotary motion detector 54, then it performs a prescribed process on the zoom adjusting control signal from outside or the detection output signal DRZ from the rotary motion detector 54, and generates the zoom control signal CZ based thereon and supplies the zoom control signal CZ to the motor action signal generator 44. Thus, the motor 40 functions in response to the motor action signal SMZ based on the zoom control signal CZ from the motor action signal generator 44 and moves the zoom lens 21 (arranged in the optical system supporting cylinder 26) in the direction along the common optical axis 27 according to the zoom control signal CZ. At this time, the action control unit 43 performs a prescribed process on the zoom control signal CZ, generates the zoom control signal for transmission, and transmits it as the external transmission signal COT.

In addition, when the action control unit 43 is supplied with the aperture adjusting control signal from outside as the external control signal CCO or with the detection output signal DRD from the rotary motion detector 55, then it performs a prescribed process on the aperture adjusting control signal from outside or the detection output signal DRD from the rotary motion detector 55, and generates the aperture control signal CD based thereon and supplies the aperture control signal CD to the motor action signal generator 45. Thus, the motor 41 functions in response to the motor action signal SMD based on the aperture control signal CD from the motor action signal generator 45 and moves the iris diaphragm 22 (arranged in the optical system supporting cylinder 26) in the direction along the common optical axis 27 according to the aperture control signal CD. At this time, the action control unit 43 performs a prescribed process on the aperture control signal CD, generates the aperture control signal for transmission, and transmits it as the external transmission signal COT.

Also, the action control unit 43 performs a prescribed process on the detection output signal DF supplied from the focus lens position detector 49 and produces the focus lens position signal CPF based thereon and supplies it to the display control signal generating unit 50. Thus, the focus lens position display 32 (which is arranged on the outer surface 28 of the lens barrel) functions in response to the display control signal SDF (based on the focus lens position signal CPF) from the display control signal generating unit 50. Then, it excites one or two of the light-emitting elements 32*a* arranged at the position corresponding to the focus lens position signal CPF, thereby making an optical display for the position of the focus lens in the optical system supporting cylinder 26. At this time, the action control unit 43 performs a prescribed process on the focus lens position signal CPF, generates the focus lens position signal for transmission, and sends it as the external transmission signal COT.

At the same time, the action control unit 43 performs a prescribed process on the detection output signal DZ supplied from the zoom lens position detector 47 and produces the zoom lens position signal CPZ based thereon and supplies it to the display control signal generating unit 51. Thus, the zoom lens position display 33 (which is arranged on the outer surface 28 of the lens barrel) functions in response to the display control signal SDZ (based on the zoom lens position signal CPZ) from the display control signal generating unit 51. Then, it excites one or two of the light-emitting elements 33*a* arranged at the position corresponding to the zoom lens position signal CPZ, thereby making an optical display for the position of the zoom lens in the optical system supporting cylinder 26. At this time, the action control unit 43 performs a prescribed process on the zoom lens position signal CPZ, generates the zoom lens position signal for transmission, and sends it as the external transmission signal COT.

Similarly, the action control unit 43 performs a prescribed process on the detection output signal DD supplied from the aperture opening detector 48 and produces the aperture opening signal CCD based thereon and supplies it to the display control signal generating unit 52. Thus, the aperture opening display 34 (which is arranged on the outer surface 28 of the lens barrel) functions in response to the display control signal SDD (based on the aperture opening signal CCD) from the display control signal generating unit 52. Then, it excites one or two of the light-emitting elements 34*a* arranged at the position corresponding to the aperture opening signal CCD, thereby making an optical display for the position of the opening of the iris diaphragm in the optical system supporting cylinder 26. At this time, the action control unit 43 performs a prescribed process on the aperture opening signal CCD, generates the aperture opening signal for transmission, and sends it as the external transmission signal COT.

Figure 4:
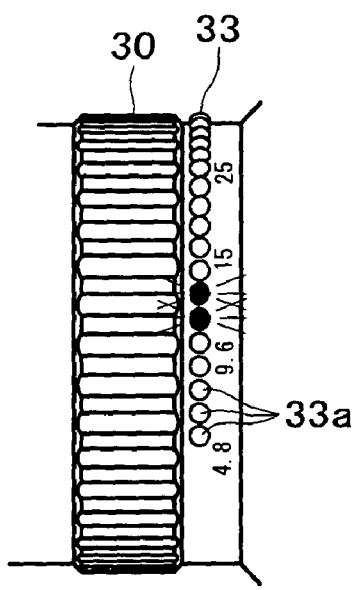
FIG. 4 is a partial side view illustrating the action of the zoom lens position display in the embodiment shown in FIG. 1.
Figure 5:
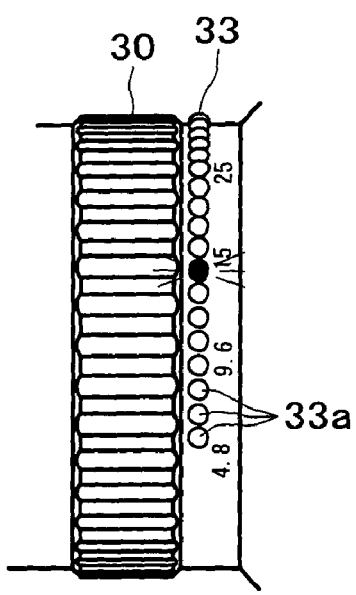
FIG. 5 is a partial side view illustrating the action of the zoom lens position display in the embodiment shown in FIG. 1.

As mentioned above, optical displays are made respectively by the focus lens position display 32, the zoom lens position display 33, and the aperture position display 34, which are arranged on the outer surface 28 of the lens barrel. The zoom lens position display 33 should preferably operate in the following manner. If those light-emitting elements to be excited among the light-emitting elements 33*a* are between two adjacent zooming indices marked along the zoom lens position display 33, then two of the light-emitting elements 33*a* are excited as shown in FIG. 4. Alternatively, if any one light-emitting elements to be excited among the light-emitting elements 33*a* is in coincidence or proximity with any one of the zooming indices marked along the zoom lens position display 33, then one of the light-emitting elements 33*a* is excited as shown in FIG. 5. In this way, the light-emitting elements 33*a* can make a display in detail in excess of the resolution of the zooming indices.

Figure 6:
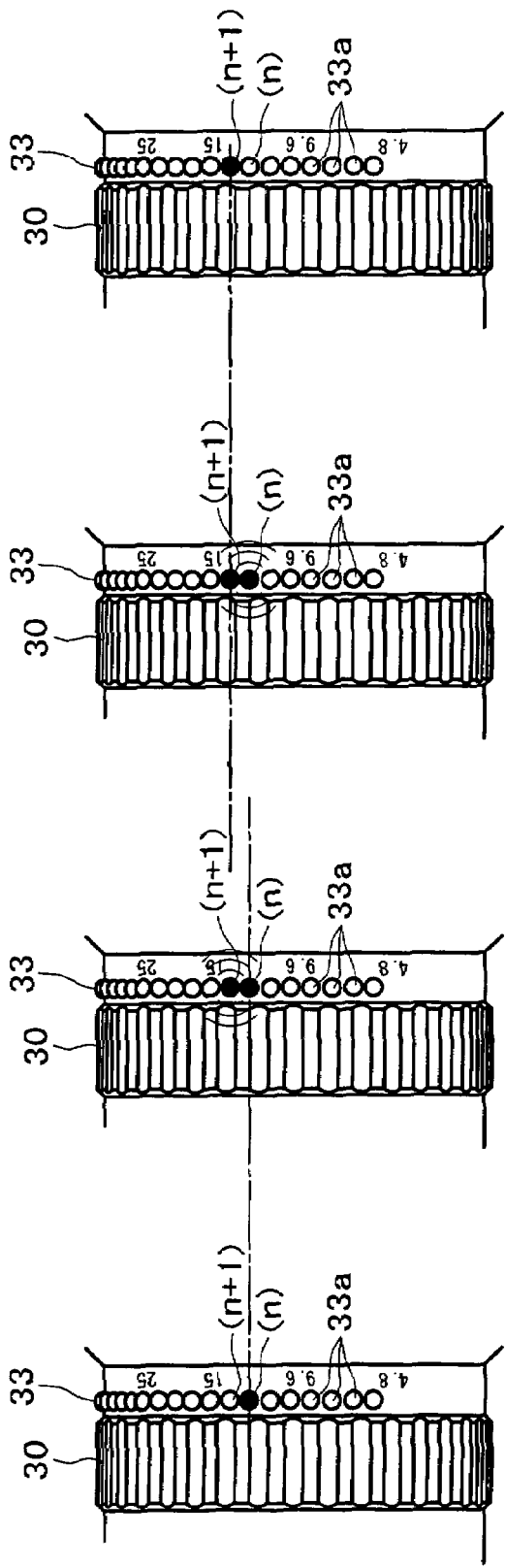
FIG. 6 is a partial side view illustrating the action of the zoom lens position display in the embodiment shown in FIG. 1.

Further, the zoom lens position display 33 should preferably operate in the following manner. When nth one of the light-emitting elements 33*a* (which is to be excited) moves to the next (n+1)th one, the nth one (indicated by (n) in FIG. 6) which is continuously excited (as shown in FIG. 6A) shifts to the (n+1)th one (indicated by (n+1) in FIG. 6) which flashes, as shown in FIG. 6B. Further, the nth one begins to flash and the (n+1)th one is continuously excited, as shown in FIG. 6C. Subsequently, only the (n+1)th one becomes continuously excited. In this way the zoom lens position display 33 permits the user to clearly know that the position of the zoom lens is moving in the lens barrel 24.

Further, the display mode by the zoom lens position display 33 should preferably be taken also by the focus lens position display 32 and the aperture opening display 34. In this way the light-emitting elements 32*a* constituting the focus lens position display 32 can make a display in detail in excess of the resolution of the focusing indices. In addition, the focus lens position display 32 permits the user to clearly know that the position of the focus lens 23 is moving in the lens barrel 24. Also, the light-emitting elements 34*a* constituting the aperture opening display 34 can make a display in detail in excess of the resolution of the aperture indices. In addition, the aperture opening display 34 permits the user to clearly know that the opening of the iris diaphragm 22 is changing in the lens barrel 24.

The light-emitting elements 32*a* constituting the focus lens position display 32, the light-emitting elements 33*a* constituting the zoom lens position display 33, and the light-emitting elements 34*a* constituting the aperture opening display 34 are excited in the following manner. Two elements at both ends and two or four elements next to them emit light differing in color from the remaining elements. FIG. 7 shows one example, in which the light-emitting elements 32*a* constituting the focus lens position display 32, the light-emitting elements 33*a* constituting the zoom lens position display 33, and the light-emitting elements 34*a* constituting the aperture opening display 34 are excited in the following manner. The two elements at both ends emit red color, the two elements next to them emit yellow color, and the remaining elements emit green color.

In the case of the light-emitting elements 32*a* constituting the focus lens position display 32, the two ones at both ends represent the limit of the range over which the focus lens can move, and the two or four ones next to the ones at both ends indicate that the position of the focus lens is getting close to the limit of the range. In the case of the light-emitting elements 33*a* constituting the zoom lens position display 33, the two ones at both ends represent the limit of the range over which the zoom lens can move, and the two or four ones next to the ones at both ends indicate that the position of the zoom lens is getting close to the limit of the range. In the case of the light-emitting elements 34*a* constituting the aperture opening display 34, the two ones at both ends represent the limit of the range over which the iris diaphragm can move, and the two or four ones next to the ones at both ends indicate that the opening of the iris diaphragm is getting close to the limit of the range. The two elements at both ends and the two or four elements next to them emit different colors, thereby allowing the user to clearly recognize that the position of the focus lens, the position of the zoom lens, and the opening of the iris diaphragm are within their range, close to the limit of their range, or at the limit of their range.

For example, if the green light-emitting elements among the light-emitting elements 32a, 33a, or 34a are excited as shown in FIG. 7, they indicate respectively that the position of the focus lens, the position of the zoom lens, or the opening of the iris diaphragm is outside the limit of the moving range or the opening range. Similarly, if the yellow light-emitting elements among the light-emitting elements 32a, 33a, or 34a are excited as shown in FIG. 7, they indicate respectively that the position of the focus lens, the position of the zoom lens, or the opening of the iris diaphragm is getting close to the limit of the moving range or the opening range. If the red light-emitting elements among the light-emitting elements 32a, 33a, or 34a are excited as shown in FIG. 7, they indicate respectively that the position of the focus lens, the position of the zoom lens, or the opening of the iris diaphragm has reached the limit of the moving range or the opening range.

Figure 8:
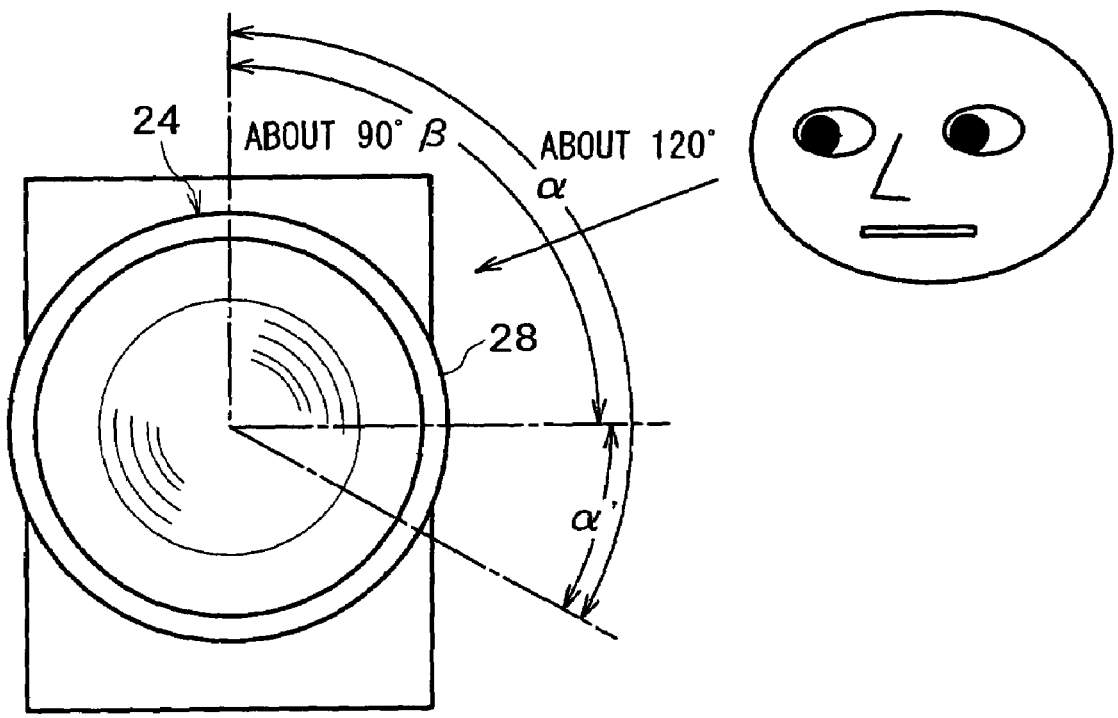
FIG. 8 is a conceptual diagram illustrating, in modified form, the focus lens position display, the zoom lens position display, and the aperture display in the embodiment shown in FIG. 1.
Figure 9:
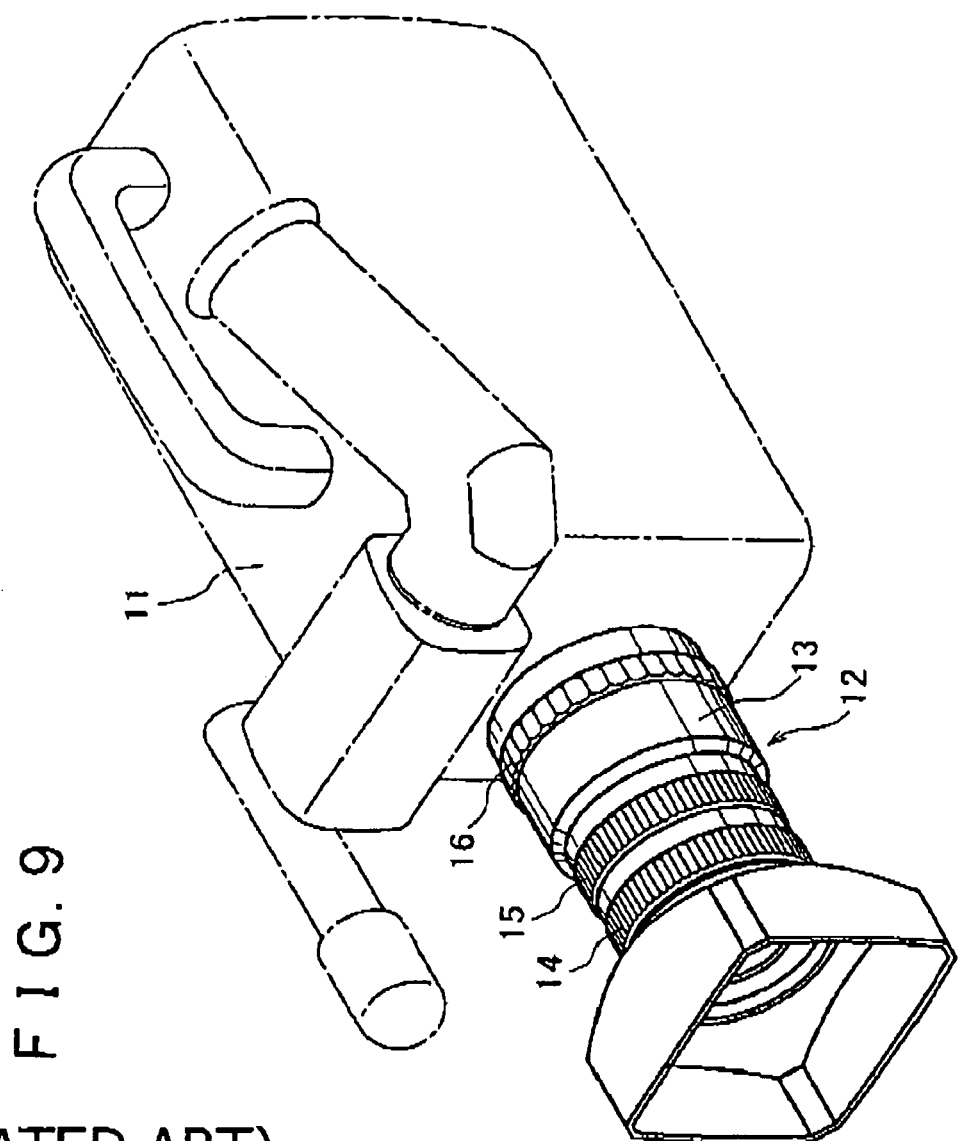
FIG. 9 is a schematic perspective view showing a video camera which has a conventional lens barrel.
Figure 10:
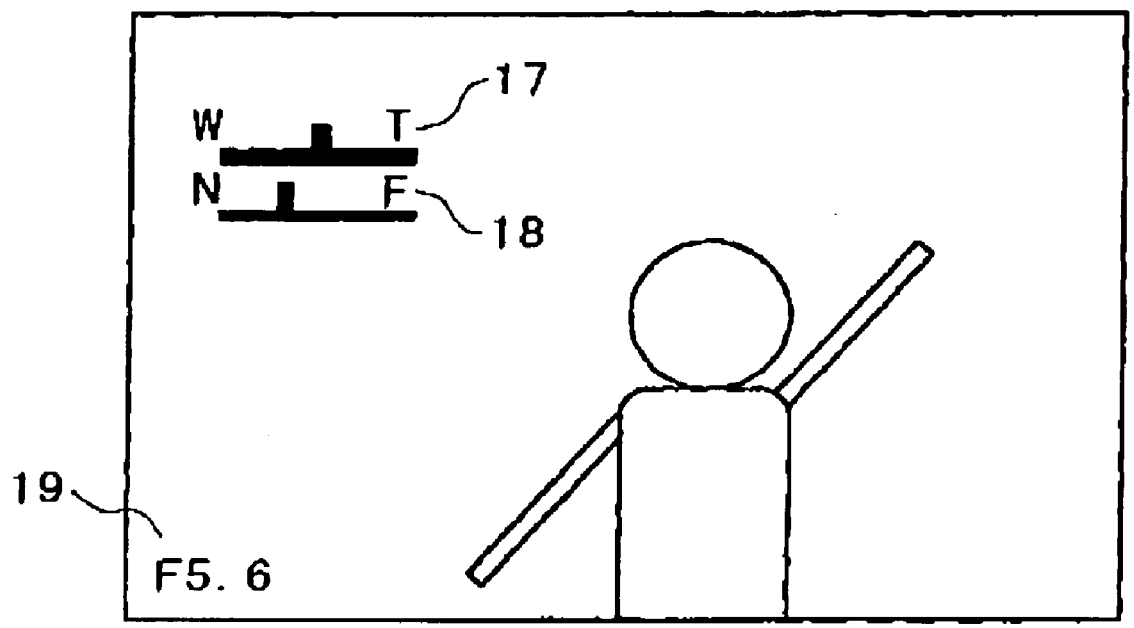
FIG. 10 is a conceptual diagram illustrating the focus lens position display, the zoom lens position display, and the aperture display in a conventional video camera.

According to the present invention, the optical system controller for the video camera has the focus lens position display 32, the zoom lens position display 33, and the aperture opening display 34 constructed such that each of them extends in the circumferential direction on the outer surface 28 of the lens barrel over an angular range of approximately 120° around the hypothetical axial line of the lens barrel 24, as shown in FIG. 8.

The above-mentioned construction, however, has the disadvantage in practical use. That is, if the focus lens position display 32, the zoom lens position display 33, or the aperture opening display 34 extends up to the angular range α' on the outer surface 28 of the lens barrel, as shown in FIG. 8. The angle α' is about 30° below the user's view, and hence the user cannot see these parts of the display.

Therefore, according to the present invention, the optical system controller for the video camera has the focus lens position display 32, the zoom lens position display 33, and the aperture opening display 34 may be constructed such that each of them extends in the circumferential direction on the outer surface 28 of the lens barrel over a reduced angular range of approximately 90° around the hypothetical axial line of the lens barrel 24, as shown in FIG. 8. This angular range is indicated by β. In this case, the user of the video camera can easily watch each of the entire focus lens position display 32, zoom lens position display 33, and aperture opening display 34 on the outer surface 28 of the lens barrel.

According to the present invention, the optical system controller for the video camera has the optical display means on the outer surface of the lens barrel 24, which is constructed of the focus lens position display 32, the zoom lens position display 33, and the aperture opening display 34 which are arranged on the outer surface 28 of the lens barrel. Each of these displays is composed of light-emitting elements 32a, 33a, or 34a. The optical display means is not limited to the one mentioned above; it may be composed of other display means (such as liquid crystal display means) in place of the light-emitting elements.

According to the present invention, the optical system controller for the video camera has the electronic control system built into the lens barrel 24. (The electronic control system includes the motors 40 and 41 and the pulse motor 42 which move the zoom lens 21, the iris diaphragm, and the focus lens 23, respectively, and the action control unit 43.)

The above-mentioned construction may be modified such that the electronic control system is arranged outside the lens barrel.

Effect of the Invention

As mentioned above, according to the present invention, the optical system controller for the video camera has the first, second, and third optical display means. The first optical display means (which indicates the position of the focus lens in the lens barrel) is arranged near the focus adjusting movable mechanism on the outer surface of the lens barrel. The second optical display means (which indicates the position of the zoom lens in the lens barrel) is arranged near the zoom adjusting movable mechanism on the outer surface of the lens barrel. The third optical display means (which indicates the opening of the iris diaphragm in the lens barrel) is arranged near the aperture adjusting movable mechanism on the outer surface of the lens barrel. Thus, the user of the video camera provided with the optical system controller can see very easily, certainly and directly the display in response to the position of the focus lens in the lens barrel, the position of the zoom lens in the lens barrel, and the opening of the iris diaphragm in the lens barrel.

Therefore, even in the case where the electronic control system is employed for the movable optical system including the zoom lens, focus lens, and iris diaphragm built into the lens barrel, the user of the video camera provided with the optical system controller can rapidly and accurately recognize the position of the focus lens, the position of the zoom lens, and the opening of the iris diaphragm in the lens barrel with the help of the first, second, and third optical display means even with his eye turned away from the view finder or monitor attached to the video camera.

Each of the first, second, and third optical display means is composed of a plurality of light-emitting elements arranged in array which emit colored light. In this case, the first, second, and third optical display means make a highly visible display without requiring any special illuminating means. Therefore, the user of the video camera provided with the optical system controller can easily recognize the position of the focus lens, the position of the zoom lens, and the opening of the iris diaphragm in the lens barrel.

What is claimed is:

1. An optical system controller for a video camera, comprising:
  a lens barrel having therein a movable optical system including a zooming lens, a focusing lens, and an iris diaphragm;
  movable mechanisms for focusing control, zooming control, and aperture control, said movable mechanisms being arranged around the lens barrel;
  a control means that controls the driving of said movable mechanisms for focusing control, zooming control, and aperture control;
  a first, second, and third optical display means that are arranged near said movable mechanisms for focusing control, zooming control, and aperture control which are arranged around the lens barrel;
  a first, second, and third detecting means to detect respectively the position of said focusing lens, the position of said zooming lens, and the opening of said iris diaphragm which change in the lens barrel;
  a first display control means that causes said first optical display means to make a display in response to the position of the focusing lens which has been detected by said first detecting means;

a second display control means that causes said second optical display means to make a display in response to the position of the zooming lens which has been detected by said second detecting means; and a third display control means that causes said third optical display means to make a display in response to the opening of the iris diaphragm which has been detected by said third detecting means, wherein the first optical display means is arranged along said focus adjusting movable mechanism, the second optical display means is arranged along said zoom adjusting mechanism, and the third optical display means is arranged along said aperture adjusting movable mechanism.

2. The optical system controller for a video camera as defined in claim 1, wherein the first optical display means is arranged in the vicinity of the focus adjusting movable mechanism, the second optical display means is arranged in the vicinity of the zoom adjusting movable mechanism, and the third optical display means is arranged in the vicinity of the aperture adjusting movable mechanism.

3. The optical system controller for a video camera as defined in claim 1, wherein each of the focus adjusting movable mechanism, the zoom adjusting movable mechanism, and the aperture adjusting movable mechanism is arranged along a ring encircling the outer surface of the lens barrel.

4. The optical system controller for a video camera as defined in claim 1, wherein each of the first, second, and third optical display means makes a display by emitting color light.

5. The optical system controller for a video camera as defined in claim 4, wherein each of the first, second, and third optical display means is composed of a plurality of light-emitting elements arranged in array.

6. The optical system controller for a video camera as defined in claim 5, wherein each of the first, second, and third optical display means excites part of the light-emitting elements at a specific position which varies depending on the focus lens position detected by the first detecting means, the zoom lens position detected by the third detecting means, and the aperture opening detected by the third detecting means.

7. The optical system controller for a video camera as defined in claim 6, wherein each of the first, second, and third optical display means excites the light-emitting elements in such a way that those which are at the ends thereof emit light differing in color from the remaining ones.

8. The optical system controller for a video camera as defined in claim 1, wherein the drive control means includes a first optical drive means which moves the zoom lens in the direction of the optical axis in response to the action of the zoom adjusting movable mechanism or the zoom adjusting control signal from outside, a second optical drive means which drives the iris diaphragm in response to the action of the aperture adjusting movable mechanism or the aperture control signal from outside, and a third optical drive means which moves the focus lens in the direction of the optical axis in response to the action of the focus adjusting movable mechanism or the focus adjusting control signal from outside.

9. The optical system controller for a video camera as defined in claim 1, wherein the first, second, and third detecting means issue respectively the first detection output signal which denotes the position of the focus lens, the second detection output signal which denotes the position of the zoom lens, and the third detection output signal which denotes the opening of the iris diaphragm, and further the first display control means actuates the first optical display means in response to the first detection output signal, the second display control means actuates the second optical display means in response to the second detection output signal, and the third display control means actuates the third optical display means in response to the third detection output signal.

* * * * *